(12) United States Patent
Bartholoma et al.

(10) Patent No.: US 7,781,685 B2
(45) Date of Patent: Aug. 24, 2010

(54) KIT OR SET COMPRISING AT LEAST TWO DIFFERENTLY DIMENSIONED TYPES OF CABLE GLANDS

(75) Inventors: Mario Bartholoma, Winden (DE); Fritz Zugel, Waldkirch (DE); Philipp Gerber, Gutach (DE)

(73) Assignee: Anton Hummel Verwaltungs GmbH, Waldkirch (DE)

( * ) Notice: Subject to any disclaimer, the term of this patent is extended or adjusted under 35 U.S.C. 154(b) by 368 days.

(21) Appl. No.: 12/064,257

(22) PCT Filed: Aug. 26, 2006

(86) PCT No.: PCT/EP2006/008378

§ 371 (c)(1),
(2), (4) Date: Feb. 20, 2008

(87) PCT Pub. No.: WO2007/028516

PCT Pub. Date: Mar. 15, 2007

(65) Prior Publication Data

US 2008/0236861 A1   Oct. 2, 2008

(30) Foreign Application Priority Data

Sep. 7, 2005   (DE) .................. 20 2005 014 138 U

(51) Int. Cl.
*H02G 3/18* (2006.01)
(52) U.S. Cl. .................. 174/654; 174/135; 174/667; 174/655; 16/2.1; 248/56; 439/462
(58) Field of Classification Search ......... 174/650–656, 174/660, 667–669, 135; 385/135, 138; 439/462, 439/583, 584, 581; 16/2.1, 2.2; 248/56
See application file for complete search history.

(56) References Cited

U.S. PATENT DOCUMENTS 3,584,888 A * 6/1971 Lott ........................... 277/589
4,629,825 A * 12/1986 Lackinger ................... 174/654

(Continued)

FOREIGN PATENT DOCUMENTS

DE    9414614    2/1996

(Continued)

*Primary Examiner*—Dhiru R Patel
(74) *Attorney, Agent, or Firm*—Volpe and Koenig, P.C.

(57) ABSTRACT

A kit or set made up of a number of differently dimensioned types of cable glands, which can each be used to hold and fix cables of different diameters or dimensions, respectively including two differently dimensioned clamping or sealing inserts so that the cable can be clamped at an outer sheath on the one hand and at an inner sheath on the other hand, wherein a shielding braid is provided between the two sheaths and emerges from the larger sheath at a point where the latter ends, with the result that it can come into touching contact with the respective cable gland. In this case, a smaller clamping or sealing insert of a larger cable gland type also has the same dimensions with regard to its support in the respective screw sleeve as the larger clamping or sealing insert of a further cable gland type of smaller dimensions; in other words, two differently dimensioned cable glands nevertheless each contain a structurally identical clamping and sealing insert, thereby improving the mass production and stocking of the sealing inserts.

5 Claims, 3 Drawing Sheets

U.S. PATENT DOCUMENTS

| | | | | |
|---|---|---|---|---|
| 5,621,191 | A | * | 4/1997 | Norris et al. ................. 174/653 |
| 5,777,269 | A | | 7/1998 | Handley |
| 6,259,029 | B1 | * | 7/2001 | Hand ........................ 174/74 R |
| 6,537,104 | B1 | * | 3/2003 | Hagmann et al. ............ 439/462 |
| 6,812,406 | B2 | * | 11/2004 | Hand .......................... 174/667 |

FOREIGN PATENT DOCUMENTS

| | | |
|---|---|---|
| EP | 0618655 | 8/1997 |
| GB | 1163901 | 9/1969 |
| GB | 2269711 | 2/1994 |
| GB | 2296998 | 7/1996 |

* cited by examiner

KIT OR SET COMPRISING AT LEAST TWO DIFFERENTLY DIMENSIONED TYPES OF CABLE GLANDS

BACKGROUND

The invention relates to a kit or set comprising at least two differently dimensioned types of cable glands for holding or fixing cables of different diameters, wherein each cable gland has two differently dimensioned clamping and/or sealing positions with two differently dimensioned clamping and/or sealing inserts and the clamping or sealing insert with a greater inner diameter is used for holding an outer cable jacket and the clamping or sealing insert with the smaller inner diameter is used for holding an at least partially stripped region of the cable, for example, on an inner jacket, wherein between an outer sheath and an inner sheath of the cable, in particular, a shielding or grounding braid is provided, which is in electrically conductive contact with the cable gland between the two clamping positions of the cable gland in the position of use, with the clamping or sealing inserts each being arranged as separate parts within a screw sleeve or a housing.

A cable gland with two differently dimensioned clamping and/or sealing positions is known from EP 0 618 655 B1. The larger dimensioned clamping insert is here formed by a seal that can be flattened with the help of a coupling ring, while the second clamping and sealing insert is constructed as a conical sealing membrane, which is directed inward and which contacts with one sealing lip on the outside of the corresponding section or region of the cable and which can be pressed more strongly onto the cable by an excess pressure, wherein a support part is provided, in order to prevent this sealing insert from turning upward.

This known cable gland has many parts, accordingly this becomes more pronounced the more such cable glands of different dimensions are required for cables of different thicknesses. In addition, inserting the cable must be performed with care primarily for sealing inserts with smaller dimensions, because during mounting the outside of the cable already slides along the internal opening of this sealing insert in a contacting manner.

SUMMARY

Therefore, there is the objective of creating a set or kit of cable glands of the type named above with different dimensions, in which the number of individual parts with different dimensions is reduced and the pushing in of the cable or the placing of the relevant cable gland on a cable can be performed largely without friction at both clamping or sealing positions.

To meet this apparently contradictory objective, the kit or set of cable glands defined above is characterized in that the smaller clamping or sealing insert of a first, larger type of cable gland has the same dimensions as the larger clamping or sealing insert of a second, smaller type of cable gland.

Thus, for cable glands of different dimensions, matching clamping and/or sealing inserts can nevertheless be used, because the smaller, sealing insert of a larger cable gland can also be used as the larger sealing insert of the small or next smaller cable gland. The number of necessary, different parts of such several cable glands of different dimensions therefore can be reduced considerably. Simultaneously, this structurally identical construction of clamping or sealing inserts or modules allows a greater series of these matching modules for different types of cable glands, that is, larger mass production and thus cost savings.

Here, it is useful when the clamping insert has a connection piece, which fits in a screw sleeve and which is supported on its end, and clamping fingers, which are separated by slots extending in the axial direction on its region projecting past this connection piece and thus also the screw sleeve and which are adjustable radially inwardly by a pressure screw or coupling ring via inclined surfaces preferably provided on this screw or ring, wherein the clamping fingers of the larger and smaller clamping insert each extend in the same direction. Thus, the smaller clamping insert of a larger cable gland can take the place of the larger clamping insert of a smaller cable gland without a problem, because its clamping fingers are then also oriented in the same direction there as in the larger clamping insert.

Here, it is especially favorable when the clamping fingers are arranged on a holding ring, for example, connected in one piece to this ring, which contacts a molded seal, in particular, a radial projection, wherein the molded seal has the connection piece engaging in the screw sleeve and an axial clamping and sealing region, which projects opposite the connection piece in the axial direction and which is pressured by the outer clamping fingers at least in the radial direction. For the axial tightening of a pressure screw or coupling ring, the clamping fingers can be deformed radially inward in a known way and therefore the seal can be pressed against the cable and thus the clamping effect can be achieved. This can be realized at both clamping and sealing positions of each cable gland in a matching way.

The sealing region of the molded seal can have a stepped end and extend with a region of smaller cross section in the position of use between the cable surface and clamping fingers. Thus, the clamping fingers do not act directly on the cable surface, but instead only indirectly via this part of the molded seal, by which the cable is prevented from damage at both the sealing and clamping positions.

A construction of the kit or set according to the invention can provide that it has at least three types of cable glands with different sizes each with two clamping or sealing inserts of different dimensions, and that the smaller clamping or sealing insert of the cable gland type with the greatest dimensions is structurally equivalent to the larger clamping or sealing insert of the middle type of cable glands, and the smaller clamping insert of the cable gland of the middle dimensions is structurally equivalent to the largest clamping and sealing insert of the smallest type of the cable glands. In the same way, also even more types of cable glands with different dimensions can form a kit or set, wherein the smaller clamping insert of a type of a greater cable gland can form, in the described way, the greater clamping and sealing insert of a smaller such cable gland, so that, overall, for such a kit or set of cable glands with different dimensions, the number of clamping and sealing inserts with different dimensions is reduced considerably and the number of structurally identical such inserts is increased accordingly, which reduces the production costs. Advantageously, the clamping inserts formed by clamping fingers ensures that, for an opened clamping insert, the cable can be inserted practically with no contact or with only little friction, according to which it is then gripped and fixed by tightening the respective clamping insert.

BRIEF DESCRIPTION OF THE DRAWINGS

Below, an embodiment of the invention is described in more detail with respect to the drawing. Shown in partially schematized representation are.

DETAILED DESCRIPTION OF THE PREFERRED EMBODIMENTS

A kit or set shown in FIG. 3 comprises at least two, in this case, three types of cable glands, which are designated as a whole with 100, 200, and 300 and which each have different dimensions, but otherwise have parts that match in their function and that therefore have matching reference symbols below.

Figure 2:
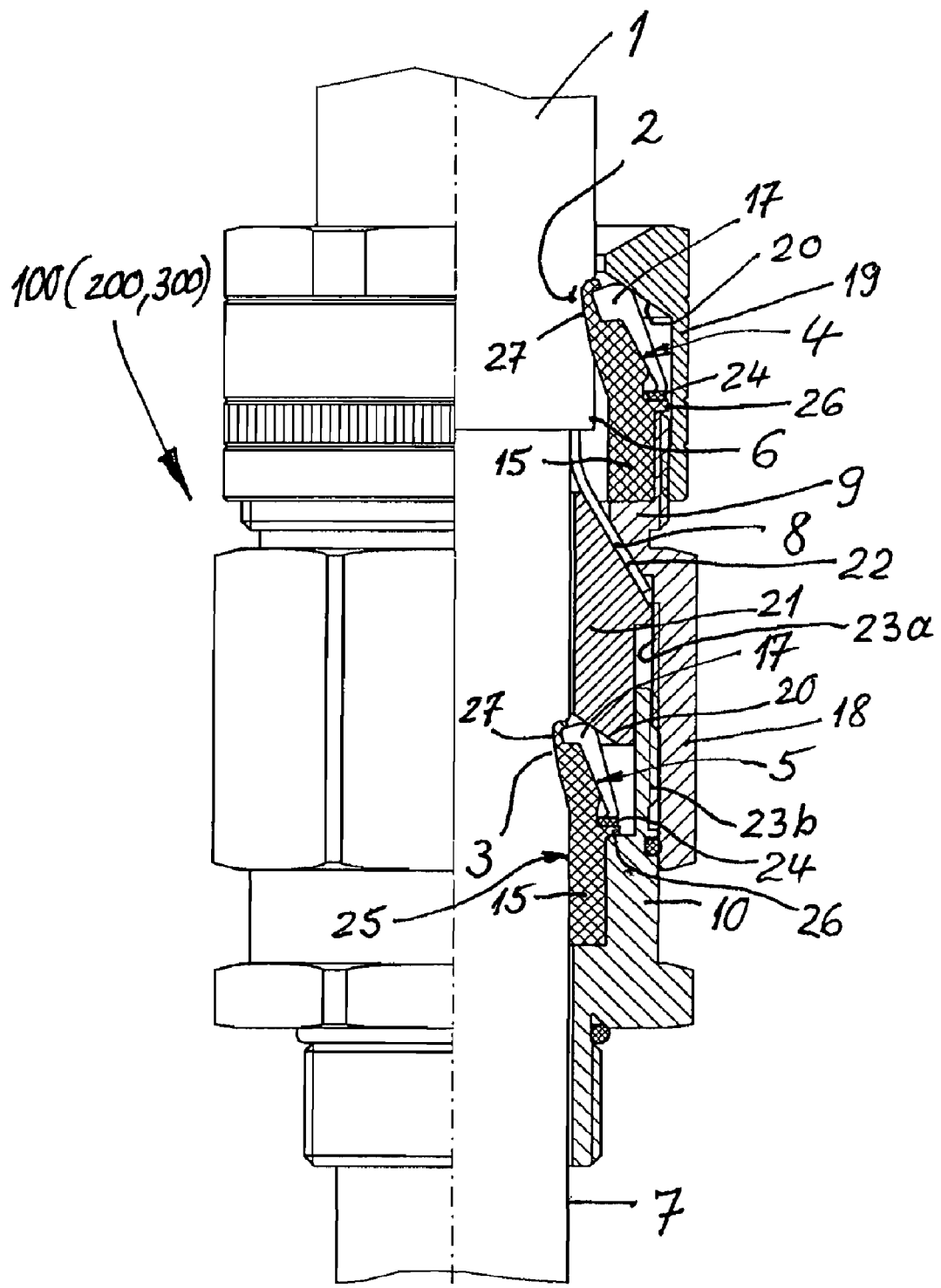
FIG. 2 a view of the cable gland according to FIG. 1 in assembled state, wherein a cable is gripped and fixed at a first larger clamping and sealing position on an outer sheath and at a smaller clamping and sealing position offset opposite in the axial direction on an inner sheath, as well as FIG. 3 a view of three such cable glands with different dimensions partially in top view, partially in longitudinal section, which each have a matching construction as the cable gland according to FIG. 1, but have different dimensions, wherein each of the smaller clamping or sealing inserts of a next larger cable gland are structurally equivalent to the larger clamping or sealing insert of a next smaller cable gland.
Figure 3:
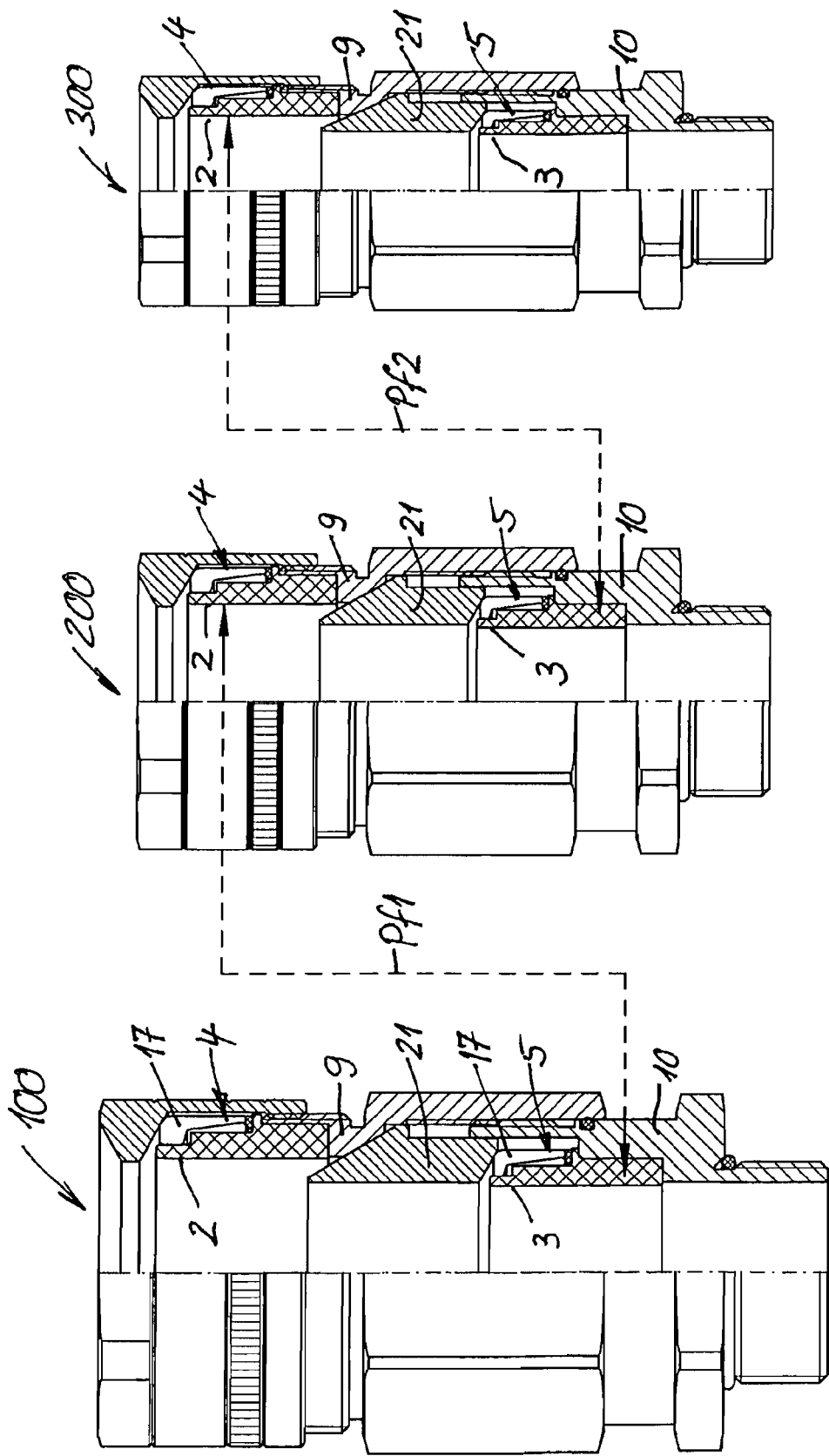

These types of cable glands with different dimensions shown in FIG. 3 can obviously be provided multiple different appropriate sizes. They are used for gripping or fixing cables 1 of different diameters, wherein such a cable 1 is shown in FIG. 2.

Here one can see that each cable gland 100, 200, and 300 has two clamping or sealing positions 2 and 3 with different dimensions with corresponding clamping and sealing inserts 4 and 5 of different dimensions, wherein the larger clamping and sealing insert is designated with 4 and the smaller clamping and sealing insert is designated with 5.

Figure 1:
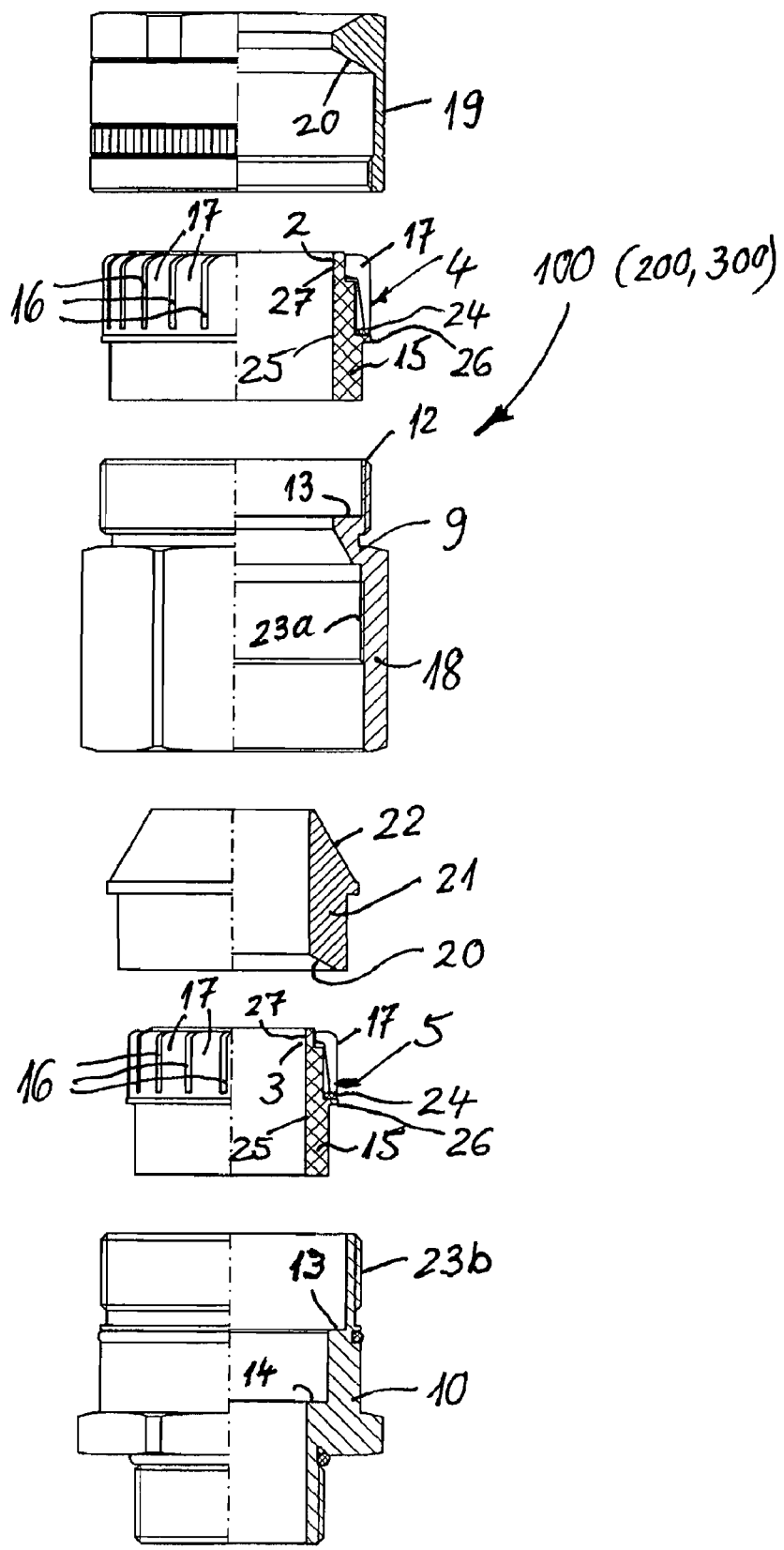
FIG. 1 one half in a side view and the other half in a longitudinal section view, of a cable gland of a kit according to the invention in exploded view, i.e., the individual parts of this cable gland are visibly pulled apart from each other.

The clamping insert 4 with a larger inner diameter is used for gripping an outer cable jacket 6 and the clamping or sealing insert 5 with the smaller inner diameter or the smaller dimensions is used for gripping a partially stripped region of the cable 1, for example, at an inner jacket 7 of the cable, wherein, according to FIG. 2, between the outer sheath 6 and the inner sheath 7 of this cable there is a shielding or grounding braid 8, which is in electrically conductive contact on the inside with this cable gland in the position of use between the two clamping or sealing positions 2 and 3 of each cable gland 100, 200, or 300. As can be seen especially well in FIG. 1, the clamping or sealing inserts 4 and 5 are here separate parts, which are each arranged in the position of use within a screw sleeve 9 and 10, wherein these parts project past these sleeves with their actual clamping region.

One can see, primarily with reference to FIG. 3, that the smaller clamping or sealing insert 5 of a larger type of cable gland 100 has the same dimensions as the larger clamping or sealing insert 4 of a second smaller type of cable gland 200 and this continues in the set of cable glands 100, 200, and 300 according to FIG. 3 to the extent that, in turn, the smaller clamping or sealing insert 5 of the cable gland 200 is structurally identical to the larger clamping or sealing insert 4 of the next smaller type of a cable gland 300. This matching of the clamping and sealing inserts is made more clear in FIG. 3 by the bent arrows Pf1 and Pf2.

Each clamping and sealing insert 4 and 5 has, in the embodiment, a connection piece 15, which matches the screw sleeves 9 and 10 and which is supported on its end 12 and/or on an inner shoulder 13 or 14, and clamping fingers 17, which are separated by slots 16 extending in the axial direction on its region projecting past this connection piece 15, and the respective screw sleeve 9 or 10 and which form, in practice, a clamping insert.

These clamping fingers 17 can each be adjusted radially inwardly by a pressure screw 18 or coupling ring 19 with inclined surfaces 20 provided on the screw or ring, wherein the clamping fingers 17 of the larger and the smaller clamping insert each extend in the same axial direction, as can be seen especially well in FIG. 2. The inclined surface 20 for the clamping fingers 17 of the smaller clamping and sealing insert 5 is here provided on a pressure ring or clamping body 21, which is pressured, on its side, with its inside onto another inclined surface 22 by the screw sleeve 9 also simultaneously constructed as a coupling ring or pressure screw 18, wherein the shielding braid 8 is also clamped at this position. The screw sleeve 9 in this case has a double function, in that it simultaneously engages, with its lower part in FIGS. 1 and 2 with an internal thread 23a provided there, the external thread 23b of the lower, smaller screw sleeve 10 and moves the clamping body 21 in the axial direction against the clamping finger 17 of the smaller clamping and sealing insert 5 by tightening these threads relative to each other and therefore deforms these radially inwardly, as shown in FIG. 2.

According to FIG. 1, the clamping fingers 17 are arranged in one piece on a holder ring 24, which is supported on and contacts a respective molded seal 25 on a radial projection 26, wherein the molded seal 25 has the connection piece 15 engaging in the screw sleeve 9 or 10 and a clamping and sealing region 27, which projects opposite this connection piece in the axial direction and which is pressured by the clamping fingers 17 arranged on the outside at least in the radial direction, as is clearly shown in FIG. 2.

Here, this sealing region 27 of the respective molded seal 25—as can be seen in all of the figures—has a stepped end and extends with a region of smaller cross section in the position of use between the cable surface and the clamping fingers 17, so that these do not contact the cable surface themselves according to FIG. 2.

According to FIG. 3, the kit in the embodiment has the already mentioned three types of cable glands 100, 200, and 300 with different dimensions each with two clamping and sealing inserts 4 and 5 with different dimensions, wherein the smaller clamping and sealing insert 5 of the cable gland type with the largest dimensions is structurally identical to the larger clamping or sealing insert 4 of the middle type of cable gland, and the smaller clamping insert 5 of the cable gland type of the middle dimensions is structurally identical to the large clamping and sealing insert 4 of the smallest type of cable gland, so that these clamping and sealing inserts that can be produced and used as separate parts can be produced in greater quantities accordingly. Here it is taken advantage of that the respective clamping inserts have clamping fingers 17 that extend in matching directions and do have different dimensions within a respective cable gland 100, 200, or 300, and, incidentally, have matching constructions, so that this identical construction of the clamping inserts 5 of a larger type of a cable gland is possible with the larger clamping insert 4 of a type of a cable gland with smaller dimensions without any adaptation in the shaping.

A kit or set of several types of cable glands 100, 200, and 300 with different dimensions, with which each cable 1 of different diameters or dimensions can be gripped and fixed, contains two clamping and sealing inserts 4 and 5 of different dimensions, in order to clamp the cable 1, on one side, to an outer sheath 6 and, on the other side, to an inner sheath 7, wherein a shielding braid 8 is provided between both sheaths and emerges from the larger sheath 6, where this sheath ends, so that it can come into touching contact with the respective cable gland. The smaller clamping or sealing insert 5 of a larger type of such a cable gland here has the same dimensions also with respect to its support in the respective screw sleeve as the larger clamping or sealing insert 4 of another type of such a cable gland of smaller dimensions, i.e., two cable glands of different dimensions each nevertheless contain a structurally identical clamping and sealing insert, which improves the mass production and stock keeping of these sealing inserts.

The invention claimed is:

1. A kit comprising at least two types of cable glands (100, 200, 300) with different dimensions for gripping or fixing cables (1) with different diameters, each of the cable glands (100, 200, 300) has two clamping or sealing positions (2, 3) with different dimensions with two clamping or sealing inserts (4, 5) with different dimensions, and the clamping or sealing insert (4) with a larger inner diameter is used for gripping an outer cable jacket (6) and the clamping or sealing insert (5) with the smaller inner diameter is used for gripping an at least partially stripped region of the cable (1) at an inner jacket (7), wherein between said outer jacket (6) and said inner jacket (7) of the cable (1) there is a shielding braid (8), which is in electrically conductive contact between the two clamping or sealing positions (2, 3) of the cable gland (100, 200, 300) in a position of use, the clamping or sealing inserts (4, 5) are each arranged as separate parts within a screw sleeve (9, 10) or a housing, a smaller one of the clamping or sealing inserts (5) of a first larger one of the cable glands (100) has the same dimensions as a larger one of the clamping or sealing inserts (4) of an at least second smaller one of the cable glands (200).

2. Kit according to claim 1, wherein the clamping and sealing insert (4, 5) has a connection piece (15), which fits in the screw sleeve (9, 10) and which is supported on the sleeve, and clamping fingers (17), which are separated by slots (16) extending in an axial direction in a region projecting past the connection piece (15) and the screw sleeve (9, 10) and which can be adjusted radially inwardly by a pressure screw (18) or coupling ring (19) via inclined surfaces (20) provided on the pressure screw or coupling ring, wherein the clamping fingers (17) of the larger clamping insert and of the smaller clamping insert each extend in the same direction.

3. Kit according to claim 2, wherein the clamping fingers (17) are arranged on a holder ring (24), which contacts a molded seal (25) wherein the molded seal (25) includes the connection piece (15) that engages in the screw sleeve (9, 10) and a clamping and sealing region (27), which projects opposite the connection piece in the axial direction and which is pressured by the clamping fingers (17) arranged on an outside thereof at least in a radial direction.

4. Kit according to claim 3, wherein the sealing region (27) of the molded seal (25) has a stepped end and extends with a region of smaller cross section in the position of use between the cable surface and the clamping fingers (17).

5. Kit according to claim 1, wherein the kit comprises at least three types of the cable glands (100, 200, 300) with different dimensions each with two of the clamping or sealing inserts (4, 5) with different dimensions and the smaller clamping or sealing insert (5) of the first larger one of the cable glands is structurally identical to the larger clamping or sealing insert (4, 5) of the second smaller one of the cable glands, and the smaller clamping or sealing insert (5) of the second smaller one of the cable glands is structurally identical to a largest clamping and sealing insert (4) of a smallest one of the cable glands.

* * * * *